United States Patent
Wang (10) Patent No.: US 11,616,733 B2
(45) Date of Patent: Mar. 28, 2023

(54) METHOD FOR CONTROLLING NETWORK CONGESTION, ACCESS DEVICE, AND COMPUTER READABLE STORAGE MEDIUM

(71) Applicant: Huawei Cloud Computing Technologies Co., Ltd., Guizhou (CN)

(72) Inventor: Jian Wang, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 309 days.

(21) Appl. No.: 16/922,281

(22) Filed: Jul. 7, 2020

(65) Prior Publication Data
US 2020/0366610 A1    Nov. 19, 2020

Related U.S. Application Data

(63) Continuation of application No. PCT/CN2018/104477, filed on Sep. 7, 2018.

(30) Foreign Application Priority Data

Jan. 8, 2018 (CN) .......................... 201810016053.0

(51) Int. Cl.
*H04L 47/78* (2022.01)
*H04L 12/46* (2006.01)
(Continued)

(52) U.S. Cl.
CPC ........ *H04L 47/781* (2013.01); *H04L 12/4633* (2013.01); *H04L 45/42* (2013.01);
(Continued)

(58) Field of Classification Search
None
See application file for complete search history.

(56) References Cited

U.S. PATENT DOCUMENTS 10,200,274 B1 *  2/2019  Suryanarayana ....... H04L 45/02
2006/0126509 A1 *  6/2006  Abi-Nassif ....... H04W 28/0247
370/235
(Continued)

FOREIGN PATENT DOCUMENTS

CN    102624723 A    8/2012
CN    103532864 A    1/2014
(Continued)

OTHER PUBLICATIONS

K. Ramakrishnan, S. Floyd, D. Black, The Addition of Explicit Congestion Notification (ECN) to IP, pp. 1-63 (Year: 2001).*
(Continued)

*Primary Examiner* — Christopher M Crutchfield
(74) *Attorney, Agent, or Firm* — Conley Rose, P.C.

(57) ABSTRACT

A method for controlling network congestion, including overlaying an overlay network packet header on an encapsulation outer layer of a transmit packet, where the overlay network packet header includes an outer Internet Protocol (IP) header, and an explicit congestion notification (ECN) identifier of an ECN is set in the outer IP header, decapsulating the overlay network packet header for an encapsulated reply packet, where an inner congestion identifier that is based on the ECN identifier is obtained from an IP header of the decapsulated reply packet through matching, and if the decapsulated reply packet is a User Datagram Protocol (UDP) packet, forwarding the UDP packet to a preset slow channel.

20 Claims, 4 Drawing Sheets

(51) Int. Cl.

| | |
|---|---|
| *H04L 45/42* | (2022.01) |
| *H04L 45/74* | (2022.01) |
| *H04L 47/11* | (2022.01) |
| *H04L 47/12* | (2022.01) |
| *H04L 69/22* | (2022.01) |
| *B60P 1/42* | (2006.01) |
| *H04L 101/663* | (2022.01) |

(52) U.S. Cl.
CPC ............ *H04L 45/74* (2013.01); *H04L 47/115* (2013.01); *H04L 47/12* (2013.01); *H04L 69/22* (2013.01); *B60P 1/42* (2013.01); *H04L 2101/663* (2022.05)

(56) References Cited

U.S. PATENT DOCUMENTS

| | | | |
|---|---|---|---|
| 2013/0322237 A1 | 12/2013 | Decusatis et al. | |
| 2015/0188820 A1* | 7/2015 | Anghel | H04L 47/10 370/235 |
| 2015/0281099 A1 | 10/2015 | Banavalikar | |
| 2016/0314012 A1 | 10/2016 | Rong et al. | |
| 2016/0337241 A1* | 11/2016 | Herrero | H04L 47/12 |

FOREIGN PATENT DOCUMENTS

| | | |
|---|---|---|
| CN | 103780954 A | 5/2014 |
| CN | 104468394 A | 3/2015 |
| CN | 104486246 A | 4/2015 |
| EP | 3214808 A1 | 9/2017 |
| WO | 2014064496 A1 | 5/2014 |

OTHER PUBLICATIONS

Y. Lin, X. Gong, W. Wang, X. Wei, L. Zhu, Tunnel Congestion Exposure and Feedback, pp. 551-554 (Year: 2013).*
B. Briscoe, Tunneling of Explicit Congestion Notification, pp. 1-35 (Year: 2010).*
Davie, B., Ed. et al., "A Stateless Transport Tunneling Protocol for Network Virtualization (STT)," draft-davie-stt-00, Feb. 29, 2012, 18 pages.
Gross, J., et al., "Geneve: Generic Network Virtualization Encapsulation," draft-gross-geneve-00, Feb. 14, 2014, 23 pages.
Zhang, Y., et al., "Research on TCP Friendly Congestion Control Technology in Wireless Network," Jun. 2006, 53 pages.
Yang, Y., "Research on Congestion Control Stratesies of Industrial Network Using UDP," May 2015, 74 pages.
Ramakrishnan, K., et al., "The Addition of Explicit Congestion Notification (ECN) to IP," RFC 3168, Sep. 2001, 63 pages.
Westerlund, M., et al., "Explicit Congestion Notification (ECN) for RTP over UDP," RFC 6679, Aug. 2012, 58 pages.

* cited by examiner

METHOD FOR CONTROLLING NETWORK CONGESTION, ACCESS DEVICE, AND COMPUTER READABLE STORAGE MEDIUM

CROSS-REFERENCE TO RELATED APPLICATIONS

This application is a continuation of International Patent Application No. PCT/CN2018/104477, filed on Sep. 7, 2018, which claims priority to Chinese Patent Application No. 201810016053.0, filed on Jan. 8, 2018, both of which are hereby incorporated by reference in their entirety.

TECHNICAL FIELD

The present disclosure relates to the communications field, and in particular, to a method for controlling network congestion, a system, a device, and a computer readable storage medium.

BACKGROUND

Compared with a backbone network of an operator, in a data center network, device costs are relatively low, a cache queue is small, congestion easily occurs when the network is busy, and consequently a packet loss is caused. Currently, in a Transmission Control Protocol (TCP), the packet loss can be sensed only after a relatively long timeout period, and then retransmission is performed. This imposes relatively great impact on a time-sensitive data flow. In addition, limited original bandwidth resources are repeatedly occupied due to retransmission, and this causes relatively low efficiency.

Cloud computing has gradually become an information technology (IT) mainstream. As a most effective and most common method for resolving a multi-tenant problem in cloud computing, an overlay network is increasingly widely used in the data center network. However, current mainstream overlay technologies such as a virtual extensible local area network (VxLAN) and network virtualization using generic routing encapsulation (NvGre) all use a User Datagram Protocol (UDP) for encapsulation. To alleviate congestion, an explicit congestion notification (ECN) technology may be used for congestion control. However, the ECN technology is applicable to only the TCP protocol, and does not support the UDP protocol.

SUMMARY

Embodiments of the present disclosure provide a method for controlling network congestion, a system, a device, and a computer readable storage medium, which are applicable to the UDP protocol, and can control network congestion.

According to a first aspect, an embodiment of the present disclosure provides a method for controlling network congestion, where the method includes overlaying an overlay network packet header on an encapsulation outer layer of a transmit packet, where the overlay network packet header includes an outer Internet Protocol (IP) header, and an ECN identifier of an ECN technology is set in the outer IP header, decapsulating the overlay network packet header for an encapsulated reply packet, where an inner congestion identifier that is based on the ECN identifier is obtained from an IP header of the decapsulated reply packet through matching, and if the decapsulated reply packet is a UDP packet, forwarding the UDP packet to a preset slow channel.

In the embodiment of the present disclosure, the overlay network packet header is overlaid on the encapsulation outer layer of the transmit packet, the overlay network packet header includes the outer IP header, and the ECN identifier is set in the outer IP header. The outer IP header has an ECN function, resolving a problem that an overlay network has no congestion control capability, which causes a packet loss and timeout waiting once congestion occurs, and causes retransmission and low efficiency. Then, the overlay network packet header is decapsulated for the encapsulated reply packet, and the inner congestion identifier that is based on the ECN identifier is obtained from the IP header of the decapsulated reply packet through matching. If the decapsulated reply packet is the UDP packet, the UDP packet is forwarded to the preset slow channel. A congestion message is transmitted using an IP header inside the reply packet, which reduces a bandwidth waste caused by the packet loss and the retransmission, and is applied to the UDP protocol such that congestion control can be performed on all packets in the network, and bandwidth allocation is more proper.

With reference to the first aspect, in the foregoing possible implementation, after that an inner congestion identifier that is based on the ECN identifier is obtained from an IP header of the decapsulated reply packet through matching, the method further includes, if the decapsulated reply packet is a TCP packet, transmitting an instruction for narrowing a receive window of the TCP packet.

In this embodiment of the present disclosure, because the receive window of the TCP packet is adjusted, a transmit rate at which an access device at a transmit end transmits the TCP packet can be narrowed, to perform congestion control on the TCP packet.

With reference to the first aspect, in the foregoing possible implementation, an ECN identifier is set in an ECN field of the outer IP header.

In this embodiment of the present disclosure, the ECN identifier is set in the ECN field of the outer IP header, which helps identify the ECN identifier.

With reference to the first aspect, in the foregoing possible implementation, the forwarding the UDP packet to a preset slow channel includes forwarding the UDP packet to the preset slow channel using a preset slow forwarding port.

In this embodiment of the present disclosure, the UDP packet is forwarded to the preset slow channel using the preset slow forwarding port.

With reference to the first aspect, in the foregoing possible implementation, the forwarding the UDP packet to a preset slow channel includes dynamically adjusting a delay value of the preset slow channel based on a periodically estimated network congestion degree, and forwarding the UDP packet to the preset slow channel after dynamic adjustment.

In this embodiment of the present disclosure, the delay value of the preset slow channel may be dynamically adjusted based on the network congestion degree such that congestion control is more proper. The UDP packet may be transmitted based on an actual network congestion degree such that network congestion is alleviated and transmission of the UDP packet is ensured at the same time.

With reference to the first aspect, in the foregoing possible implementation, the forwarding the UDP packet to a preset slow channel includes preferentially forwarding the UDP packet to the preset slow channel in a preset timeout period.

In this embodiment of the present disclosure, an impact of network congestion on UDP packet transmission can be reduced.

With reference to the first aspect, in the foregoing possible implementation, after the preferentially forwarding the UDP packet to the preset slow channel in a preset timeout period, the method further includes transmitting the UDP packet to a normal channel beyond the preset timeout period.

In this embodiment of the present disclosure, an impact of network congestion on UDP packet transmission can be reduced.

According to a second aspect, an embodiment of the present disclosure provides a method for controlling network congestion, where the method includes receiving a transmit packet overlaid by an overlay network packet header, where the overlay network packet header includes an outer IP header, an ECN congestion identifier of an ECN technology is set in the outer IP header, and the ECN congestion identifier is set based on an ECN identifier of the outer IP header when an intermediate node is congested, decapsulating the transmit packet, to obtain the ECN congestion identifier through matching, and setting an inner congestion identifier in an IP header of a reply packet, and encapsulating the overlay network packet header in the reply packet provided with the inner congestion identifier, and sending an encapsulated reply packet.

In the embodiment of the present disclosure, the transmit packet encapsulated with the overlay network packet header is received, and the ECN congestion identifier is set in the outer IP header. The outer IP header has an ECN function, resolving a problem that an overlay network has no congestion control capability, which causes a packet loss and timeout waiting once congestion occurs, and causes retransmission and low efficiency. Then, when the ECN congestion identifier is obtained through matching, the inner congestion identifier may be set in the IP header of the reply packet, to notify an access device at a transmit end that network congestion occurs on a transmission path of the transmit packet. A congestion message is transmitted using an IP header inside the reply packet, which reduces a bandwidth waste caused by the packet loss and the retransmission, and is applied to the UDP protocol such that congestion control can be performed on all packets in the network, and bandwidth allocation is more proper.

With reference to the second aspect, in the possible implementation, the decapsulating the transmit packet, to obtain the ECN congestion identifier through matching, and setting an inner congestion identifier in an IP header of a reply packet includes decapsulating the transmit packet, to obtain the ECN congestion identifier in the IP header of the overlay network packet header through matching, obtaining a source IP address, a source port, a destination IP address, and a destination IP port of the transmit packet, generating the inner congestion identifier based on the source IP address, the source port, the destination IP address, and the destination IP port of the transmit packet, and setting the inner congestion identifier in the IP header of the reply packet.

In the embodiment of the present disclosure, the inner congestion identifier may be generated based on the IP address and the port of the transmit packet, to explicitly notify the access device at the transmit end of a specific packet whose a packet transmission path encounters network congestion.

With reference to the second aspect, in the foregoing possible implementation, the method further includes dynamically adjusting a receive window of a TCP packet based on a received instruction for narrowing the receive window of the TCP packet and based on a periodically evaluated network congestion degree.

In this embodiment of the present disclosure, because the receive window of the TCP packet is adjusted, a transmit rate at which an access device at a transmit end transmits the TCP packet can be narrowed, to perform congestion control on the TCP packet.

With reference to the second aspect, in the possible implementation, the decapsulating the transmit packet, to obtain the ECN congestion identifier through matching, and setting an inner congestion identifier in an IP header of a reply packet includes decapsulating the transmit packet, to obtain the ECN congestion identifier through matching, and setting the inner congestion identifier and a preset timeout period in the IP header of the reply packet. The dynamically adjusting a receive window of a TCP packet includes dynamically adjusting the receive window of the TCP packet in the preset timeout period.

In this embodiment of the present disclosure, an impact of network congestion on TCP packet transmission can be reduced.

With reference to the second aspect, in the foregoing possible implementation, after the dynamically adjusting the receive window of the TCP packet in the preset timeout period, the method further includes restoring an initial value of the receive window of the TCP packet beyond the preset timeout period.

In this embodiment of the present disclosure, an impact of network congestion on TCP packet transmission can be reduced.

According to a third aspect, an embodiment of the present disclosure provides an access device, where the access device includes a first encapsulation module configured to overlay an overlay network packet header on an encapsulation outer layer of a transmit packet, where the overlay network packet header includes an outer IP header, and an ECN identifier of an ECN technology is set in the outer IP header, a first decapsulation module configured to decapsulate the overlay network packet header for an encapsulated reply packet, where an inner congestion identifier that is based on the ECN identifier is obtained from an IP header of the decapsulated reply packet through matching, and a UDP module configured to forward, if the decapsulated reply packet is a UDP packet, the UDP packet to a preset slow channel.

With reference to the third aspect, in the foregoing possible implementation, the access device further includes a TCP module configured to transmit, if the decapsulated reply packet is a TCP packet, an instruction for narrowing a receive window of the TCP packet.

With reference to the third aspect, in the foregoing possible implementation, the ECN identifier is set in an ECN field of the outer IP header.

With reference to the third aspect, in the foregoing possible implementation, the UDP module is further configured to forward the UDP packet to the preset slow channel using a preset slow forwarding port.

With reference to the third aspect, in the foregoing possible implementation, the UDP module is further configured to dynamically adjust a delay value of the preset slow channel based on a periodically estimated network congestion degree, and forward the UDP packet to the preset slow channel after dynamic adjustment.

With reference to the third aspect, in the foregoing possible implementation, the UDP module is further configured to preferentially forward the UDP packet to the preset slow channel in a preset timeout period.

With reference to the third aspect, in the foregoing possible implementation, the UDP module is further configured to transmit the UDP packet to a normal channel beyond the preset timeout period.

According to a fourth aspect, an embodiment of the present disclosure provides an access device. The access device includes a receiving module configured to receive a transmit packet overlaid by an overlay network packet header, where the overlay network packet header includes an outer IP header, an ECN congestion identifier of an ECN technology is set in the outer IP header, and the ECN congestion identifier is set based on an ECN identifier of the outer IP header when an intermediate node is congested, a second decapsulation module configured to, if the ECN congestion identifier is obtained through matching, set an inner congestion identifier in an IP header of a reply packet, and a second encapsulation module configured to encapsulate the overlay network packet header for the reply packet provided with the inner congestion identifier, and transmit the encapsulated reply packet.

With reference to the fourth aspect, in the possible implementation, the second decapsulation module is further configured to decapsulate the transmit packet, to obtain the ECN congestion identifier through matching in an IP header of the overlay network packet header, obtain a source IP address, a source port, a destination IP address, and a destination IP port of the transmit packet, generate the inner congestion identifier based on the source IP address, the source port, the destination IP address, and the destination IP port of the transmit packet, and set the inner congestion identifier in the IP header of the reply packet.

With reference to the fourth aspect, in the foregoing possible implementation, the access device further includes a TCP module configured to dynamically adjust a receive window of a TCP packet based on a received instruction for narrowing the receive window of the TCP packet and based on a periodically evaluated network congestion degree.

With reference to the fourth aspect, in the foregoing possible implementation, the second decapsulation module is further configured to decapsulate the transmit packet, to obtain the ECN congestion identifier through matching, and set the inner congestion identifier and a preset timeout period in the IP header of the reply packet. The TCP module is further configured to dynamically adjust the receive window of the TCP packet in the preset timeout period.

With reference to the fourth aspect, in the foregoing possible implementation, the TCP module is further configured to restore the receive window of the TCP packet to the initial value beyond the preset timeout period A fifth aspect of this application provides a computer readable storage medium. The computer readable storage medium stores an instruction, and when the instruction is run on a computer, the computer performs the method according to each of the foregoing aspects.

A sixth aspect of this application provides a computer program product including an instruction. When the instruction is run on a computer, the computer is enabled to perform the method in the foregoing aspects.

A seventh aspect of this application provides a computer program. When the computer program is run on a computer, the computer is enabled to perform the method in the foregoing aspects.

BRIEF DESCRIPTION OF DRAWINGS

The present disclosure may be better understood from the following description of specific implementations of the present disclosure with reference to the accompanying drawings. Same or similar accompanying drawings represent same or similar features.

DESCRIPTION OF EMBODIMENTS

In the embodiment of the present disclosure, an outer overlay network packet header is encapsulated in a transmit packet. The overlay network packet header includes an outer IP header, and an ECN identifier is set in the outer IP header. In this way, the outer IP header has an ECN function. Then, the overlay network packet header is decapsulated from an encapsulated reply packet, and an inner congestion identifier that is based on the ECN identifier is obtained from an IP header of a decapsulated reply packet through matching. If the decapsulated reply packet is a UDP packet, the UDP packet is forwarded to a preset slow channel. A congestion message is transmitted using the IP header of the reply packet such that an overlay network header has a congestion control capability for reducing a bandwidth waste caused by a packet loss and retransmission, and is further applied to a UDP protocol.

Figure 1:
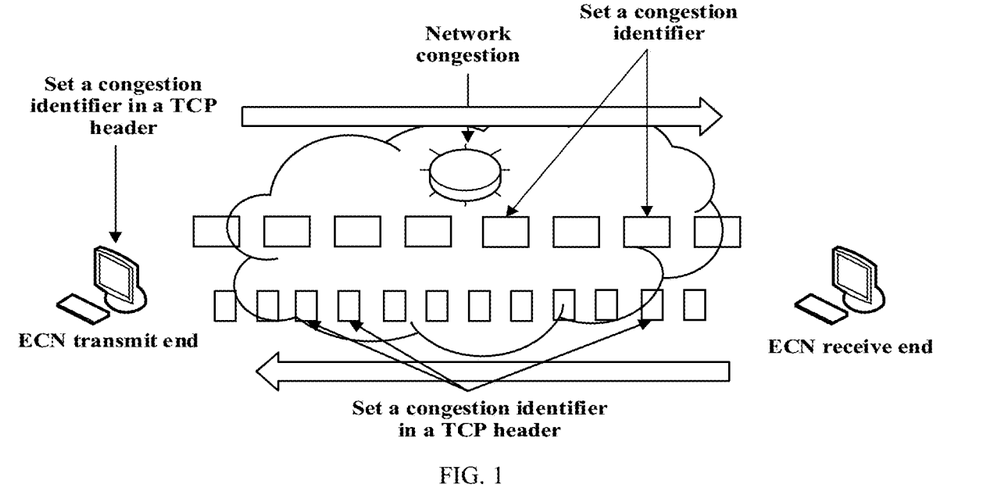
FIG. 1 is a schematic diagram of congestion control using a congestion control technology.

The following describes in detail technical solutions in the embodiments of the present disclosure with reference to the accompanying drawings. FIG. 1 is a schematic diagram of congestion control using a congestion control technology.

An ECN transmit end first sends a TCP transmit packet including an ECN identifier to an ECN receive end, and then the ECN receive end sends a TCP reply packet including a congestion identifier to the ECN transmit end.

A. The ECN transmit end sets the ECN identifier in an IP header of the TCP transmit packet, and the ECN transmit end sends the TCP transmit packet including the ECN identifier to the ECN receive end.

B. When network congestion occurs on a node on a transmission path, if the ECN identifier is found from the IP header of the TCP transmit packet, compared with a conventional TCP protocol in which a direct packet loss occurs, in an ECN protocol, a node modifies only the ECN identifier in the IP header of the TCP transmit packet to set a congestion identifier, and the congestion identifier is set to notify the ECN receive end of the network congestion.

C. After receiving the TCP transmit packet including the ECN identifier, the ECN receive end sets the congestion identifier in a TCP header of the reply packet replied to the ECN transmit end, to notify the ECN transmit end that network congestion occurs on a packet path in step A.

D. After receiving the TCP reply packet and detecting the congestion identifier in the TCP packet header of the TCP reply packet, the ECN transmit end halves a TCP congestion window of the ECN transmit end in order to reduce a transmit rate.

It can be learned from the foregoing process in which the ECN transmit end interacts with the ECN receive end that ECN congestion control is applicable to only the TCP protocol, but does not support a UDP protocol. However, overlay technologies commonly used in a data center network includes a VxLAN and NvGRE, and both the VxLAN and the NvGRE use the UDP for encapsulation. In addition, bandwidth allocation is uneven. An ECN transmit end that supports the ECN protocol reduces a transmit rate, but a transmit end that does not support the ECN may increase a transmit rate instead of reducing the rate, to preempt more bandwidths.

Figure 2:
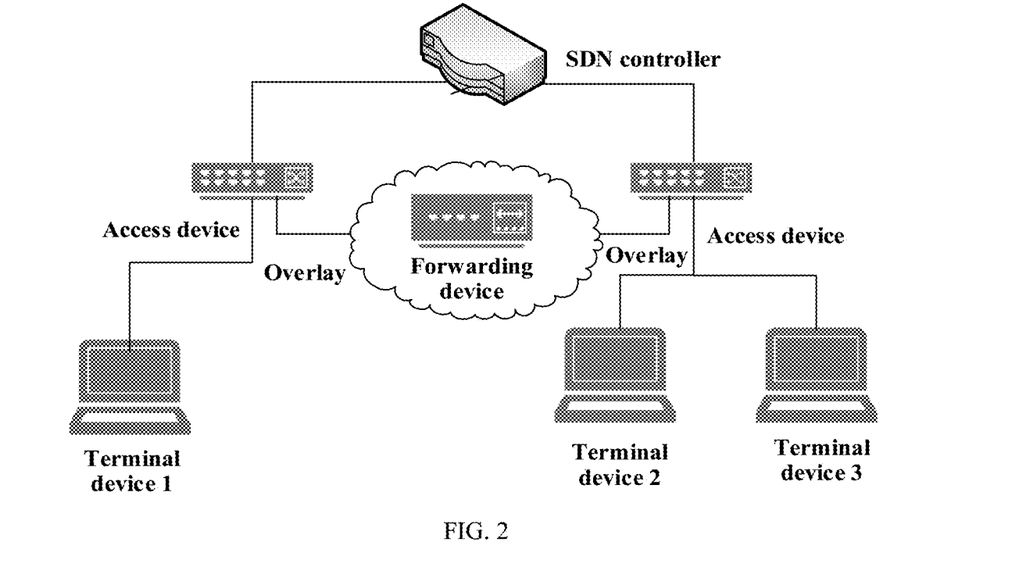
FIG. 2 is a schematic diagram of typical overlay networking in a data center.

FIG. 2 is a schematic diagram of typical overlay networking in a data center. The typical overlay networking includes a software-defined network (SDN) controller, an access device, and a forwarding device.

The SDN controller is responsible for controlling all network forwarding rules. An overlay network includes several access devices and a forwarding device. In other words, overlay networking is performed between the access device and the forwarding device. Each access device is connected to one or more terminal devices.

The terminal device sends a transmit packet, encapsulates an overlay network packet header in an access device, and enters the overlay network. The forwarding device in the overlay network forwards the transmit packet, and the transmit packet arrives at a peer access device after being transmitted through the overlay network. The peer access device decapsulates the overlay packet header, and forwards the transmit packet to a corresponding receiving device.

Figure 3:
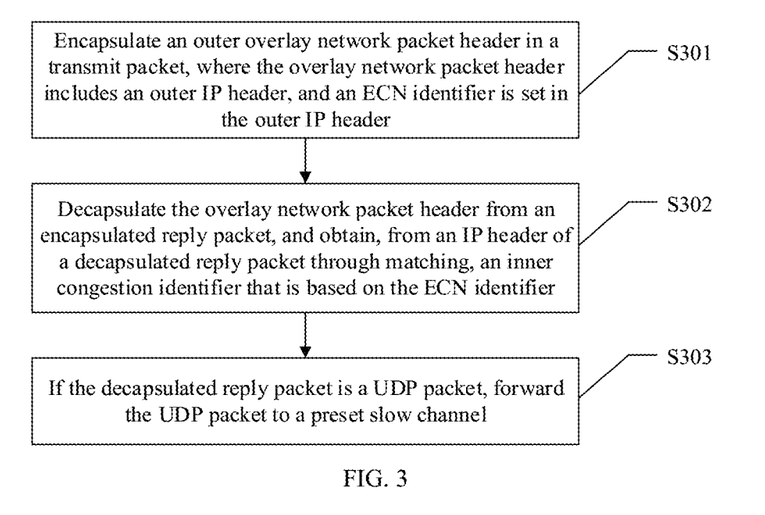
FIG. 3 is a schematic flowchart of a method for controlling network congestion according to an embodiment of the present disclosure.

FIG. 3 is a schematic flowchart of a method for controlling network congestion according to an embodiment of the present disclosure. A corresponding execution body is an access device at a transmit end. The method further includes the following steps.

S301. Encapsulate an outer overlay network packet header in a transmit packet.

The overlay network packet header includes an outer IP header, and an ECN identifier is set in the outer IP header.

In a network technology field, overlay is an overlay virtualization technology mode on a network architecture, and has the following general framework an application is carried on a network and is separated from another network service without greatly modifying the infrastructure network, and an IP-based infrastructure network technology is mainly used.

An overlay network is a virtual network established on an existing network. A logical node and a logical link constitute the overlay network. The overlay network has independent control and forwarding planes, and a physical network is transparent to a terminal system externally connected to an overlay edge device.

In the overlay, a layer 2 packet is encapsulated above a packet. In other words, the packet is added to a tunnel layer, and IP forwarding is performed at the tunnel layer. Tunnel encapsulation is completed by an access device in the overlay network. The overlay has the following advantages the access device has relatively high forwarding performance, and networking and interworking between non-virtual physical servers can be supported.

A logical tunnel for transmitting an encapsulated packet is established between two access devices. In other words, the access device at the transmit end encapsulates the outer overlay network packet header in the transmit packet. The overlay network packet header includes a specific network packet header in the overlay, a transport layer protocol header, and an IP header. The specific network packet header in the overlay may include a VxLAN header or an NvGre header. The transport layer protocol header includes a TCP header or a UDP header.

The overlay network packet header encapsulates a layer 2 packet above a packet. Therefore, the IP header in the overlay packet header is an outer IP header. Correspondingly, an IP header in the packet above which the layer 2 packet is encapsulated is referred to as an inner IP header.

The ECN identifier is set in the outer IP header. If network congestion occurs when a packet obtained after the overlay packet header is encapsulated is transmitted in the overlay network, an intermediate node may set an ECN congestion identifier based on the ECN identifier that is set in the outer IP header. For example, the ECN identifier may be set in an ECN field of the outer IP header. Therefore, this helps identify the ECN identifier.

S302. Decapsulate the overlay network packet header from an encapsulated reply packet, and obtain, from an IP header of a decapsulated reply packet through matching, an inner congestion identifier that is based on the ECN identifier.

The access device at the transmit end receives the reply packet in which the overlay network packet header is encapsulated and that is sent by a receiving device at a receive end, and then decapsulates the reply packet in which the overlay network packet header is encapsulated, to obtain the reply packet.

The inner congestion identifier that is based on the ECN identifier is obtained from the IP header of the reply packet through matching. The inner congestion identifier is an identifier generated by the receiving device at the receive end based on a source IP address of the transmit packet, a source port of the transmit packet, a destination IP address of the transmit packet, and a destination IP port of the transmit packet. The ECN identifier is set by the intermediate node.

In other words, the transmit packet includes the source IP address of the transmit packet, the source port of the transmit packet, the destination IP address of the transmit packet, and the destination IP port of the transmit packet. The inner congestion identifier is generated based on the source IP address of the transmit packet, the source port of the transmit packet, the destination IP address of the transmit packet, and the destination IP port of the transmit packet.

If the access device at the transmit end obtains, from the IP header of the reply packet through matching, the inner congestion identifier that is based on the ECN identifier, it indicates that network congestion occurs on a transmission path of the transmit packet.

S303. If the decapsulated reply packet is a UDP packet, forward the UDP packet to a preset slow channel.

When network congestion occurs on the transmission path of the transmit packet, the access device at the transmit end may further determine, using the transport layer protocol header, whether the reply packet is a TCP packet or a UDP packet. The TCP packet and the UDP packet are processed in different manners.

If the reply packet is the UDP packet, the UDP packet may be forwarded to the preset slow channel. Specifically, one or more slow channels are created on or externally connected to the access device in advance. If network congestion occurs on the transmission path of the transmit packet, in other words, if the inner congestion identifier that is based on the ECN identifier is obtained from the IP header of the reply packet through matching, the UDP packet is forwarded to the preset slow channel.

Figure 4:
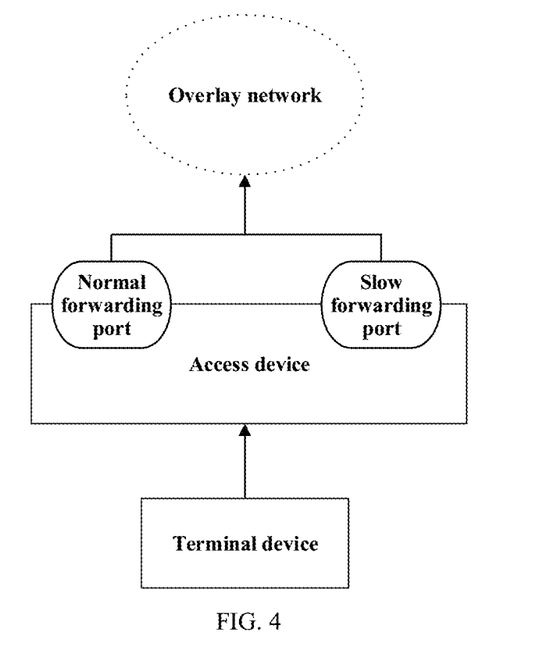
FIG. 4 is a schematic structural diagram of an example of an access device according to an embodiment of the present disclosure.

In an example, FIG. 4 is a schematic structural diagram of an access device according to an embodiment of the present disclosure. The access device includes one or more normal forwarding ports. On this basis, the access device may further include one or more slow forwarding ports. If a UDP packet needs to be forwarded to a preset slow channel, the UDP packet may be forwarded to the preset slow channel using the slow forwarding port.

In this embodiment of the present disclosure, an outer overlay network packet header is encapsulated in a transmit packet. The overlay network packet header includes an outer IP header, and an ECN identifier is set in the outer IP header. The outer IP header has an ECN function, to resolve extremely low efficiency caused by a packet loss, wait timeout, and retransmission that are caused by congestion occurring because an overlay network has no congestion control capability. Then, the overlay network packet header is decapsulated from an encapsulated reply packet, and an inner congestion identifier that is based on the ECN identifier is obtained from an IP header of the decapsulated reply packet through matching. If the decapsulated reply packet is the UDP packet, the UDP packet is forwarded to the preset slow channel. A congestion message is transmitted using an inner IP header of the reply packet. This reduces a bandwidth waste caused by a packet loss and retransmission, and is also applied to a UDP protocol such that congestion control can be performed on all packets in the network, and bandwidth allocation is more proper.

In an embodiment of the present disclosure, if network congestion occurs on a transmission path of the transmit packet, an access device at a transmit end may further determine, using a transport layer protocol header, that the reply packet is a TCP packet. The TCP packet and the UDP packet are processed in different manners.

If the reply packet is the TCP packet, an instruction for narrowing a receive window of the TCP packet is sent to an access device at a receive end. The instruction for narrowing the receive window of the TCP packet is used to adjust the receive window of the TCP packet.

According to stipulations in the TCP protocol, a transmit rate at which the access device at the transmit end sends a TCP packet is equal to a smaller value of a receive window of a TCP packet of the access device at the receive end and a congestion window of a TCP packet of the access device at the transmit end.

In the foregoing embodiment, narrowing a receive window of a TCP packet can reduce the transmit rate at which the access device at the transmit end transmits the TCP packet, to perform congestion control on the TCP packet.

In an embodiment of the present disclosure, a slow channel may be further adjusted dynamically. Specifically, a delay value of the preset slow channel is dynamically adjusted based on a periodically estimated network congestion degree. Then, the UDP packet is forwarded to the preset slow channel after the dynamic adjustment.

The network congestion degree may be periodically evaluated. If a network congestion degree evaluated in one period is relatively low, the delay value of the preset slow channel may be reduced. If a network congestion degree evaluated in one period is relatively high, the delay value of the preset slow channel may be increased. A period may be preset. A step of adjusting the delay value of the slow channel may be set based on an actual network status.

After the delay value of the preset slow channel is adjusted, the UDP packet may be forwarded to the preset slow channel. In this way, the UDP packet may be transmitted to the access device at the receive end through the preset slow channel.

In the foregoing embodiment, the delay value of the preset slow channel may be dynamically adjusted based on the network congestion degree such that congestion control is more proper. The UDP packet may be sent based on an actual network congestion degree such that transmission of the UDP packet is ensured while network congestion is alleviated.

In an embodiment of the present disclosure, considering that network congestion changes with time, a timeout period may be preset. The UDP packet may be preferentially forwarded to the preset slow channel in the preset timeout period. The UDP packet is transmitted to a normal channel beyond the preset timeout period.

For example, the preset timeout period is T. Timing is started if the access device at the transmit end obtains the inner congestion identifier through matching in the IP header of the reply packet. Within T, the UDP packet may be preferentially forwarded to the preset slow channel, and the UDP packet is not sent on a normal forwarding port. After T, the UDP packet may be sent to the normal channel.

In the foregoing embodiment, when network congestion occurs, a rate for sending a UDP packet is reduced in the preset timeout period, and the UDP packet can be normally sent beyond the preset timeout period. Therefore, this can reduce impact imposed by network congestion on UDP packet transmission.

The following describes the technical solutions in the embodiments of the present disclosure from the perspective of the access device at the receive end.

Figure 5:
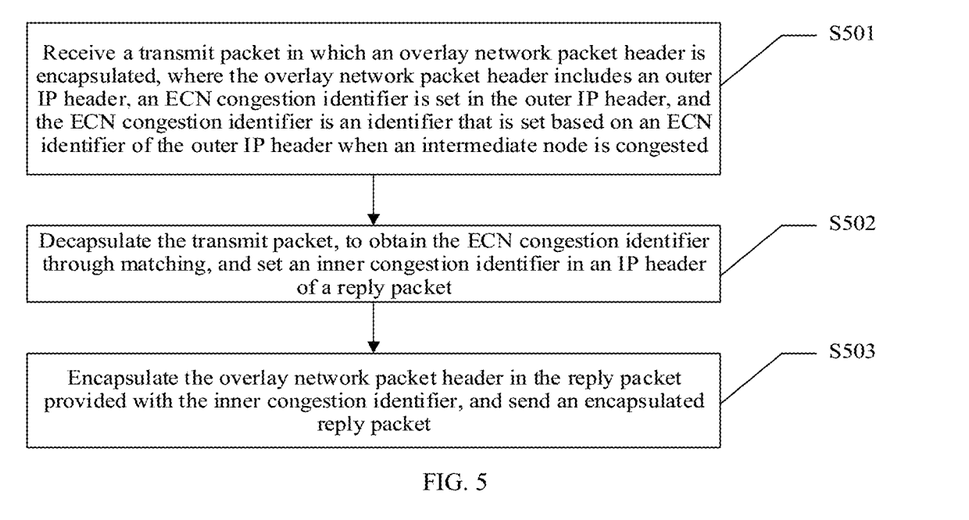
FIG. 5 is a schematic flowchart of a method for controlling network congestion according to another embodiment of the present disclosure.

FIG. 5 is a schematic flowchart of a method for controlling network congestion according to another embodiment of the present disclosure. A corresponding execution body is an access device at a receive end. The method further includes the following steps.

S501. Receive a transmit packet in which an overlay network packet header is encapsulated, where the overlay network packet header includes an outer IP header, an ECN congestion identifier is set in the outer IP header, and the ECN congestion identifier is an identifier that is set based on an ECN identifier of the outer IP header when an intermediate node is congested.

The access device at the receive end receives the transmit packet in which the overlay network packet header is encapsulated. The overlay network packet header includes the outer IP header, and the ECN identifier is set in the outer IP header.

When network congestion occurs in the intermediate node, the intermediate node sets, to the ECN congestion identifier, the ECN identifier of the outer IP header of the transmit packet encapsulated with the overlay network header. In this way, the access device at the receive end can learn the network congestion. That is, the ECN congestion identifier is set based on the ECN identifier of the outer IP header when the intermediate node is congested.

S502. Decapsulate the transmit packet, to obtain the ECN congestion identifier through matching, and set an inner congestion identifier in an IP header of a reply packet.

The access device at the receive end decapsulates the transmit packet, and the transmit packet is encapsulated with the overlay network packet header.

If the outer IP header of the transmit packet encapsulated with the overlay network packet header obtains the ECN congestion identifier through matching, it indicates that the network congestion occurs on a transmission path of the transmit packet. If the outer IP header of the transmit packet encapsulated with the overlay network packet header does not obtain the ECN congestion identifier through matching, it indicates that network congestion does not occur on the transmission path of the transmit packet.

If the outer IP header of the transmit packet encapsulated with the overlay network packet header obtains the ECN congestion identifier through matching, a case in which the network congestion occurs on the transmission path of the transmit packet needs to be notified to an access device at a transmit end. The inner congestion identifier may be set in the IP header of the reply packet. In this way, after receiving the reply packet, the transmit end can learn that the network congestion can be transmitted.

S503. Encapsulate the overlay network packet header in the reply packet provided with the inner congestion identifier, and send an encapsulated reply packet.

Because the reply packet provided with the inner congestion identifier needs to be transmitted in an overlay network, the overlay network packet header is encapsulated for the reply packet provided with the inner congestion identifier, and then the encapsulated reply packet is transmitted in the overlay network.

In the embodiment of the present disclosure, the transmit packet encapsulated with the overlay network packet header is received, and the ECN congestion identifier is set in the outer IP header. The outer IP header has an ECN function, resolving a problem that the overlay network has no congestion control capability, which causes a packet loss and timeout waiting once congestion occurs, and causes retransmission and low efficiency. Then, when the ECN congestion identifier is obtained through matching, the inner congestion identifier may be set in the IP header of the reply packet, to notify the access device at the transmit end that network congestion occurs on the transmission path of the transmit packet. A congestion message is transmitted using the IP header inside the reply packet, which reduces a bandwidth waste caused by the packet loss and the retransmission, and is applied to the UDP protocol such that congestion control can be performed on all packets in the network, and bandwidth allocation is more proper.

In an embodiment of the present disclosure, the access device at the receive end decapsulates the transmit packet, the ECN congestion identifier is obtained from an IP header of the overlay network packet header of the transmit packet through matching, and the ECN identifier is set by the intermediate node. The access device at the receive end learns that network congestion occurs on the transmission path of the transmit packet.

The receiving device at the receive end obtains, from the transmit packet, a source IP address of the transmit packet, a source port of the transmit packet, a destination IP address of the transmit packet, and a destination IP port of the transmit packet. The inner congestion identifier is generated based on the source IP address of the transmit packet, the source port of the transmit packet, the destination IP address of the transmit packet, and the destination IP port of the transmit packet. The inner congestion identifier may be set in the IP header of the reply packet.

In the embodiment of the present disclosure, the inner congestion identifier may be generated based on the IP address and the port of the transmit packet, to explicitly notify an access device at a transmit end of a specific packet whose a packet transmission path encounters network congestion.

In an embodiment of the present disclosure, a network congestion degree may be periodically evaluated. If the network congestion degree is evaluated to be relatively low in one period, a decrease in a receive window of a TCP header is relatively small. If the network congestion degree is evaluated to be relatively high in one period, a decrease in the receive windows of the TCP header is relatively large. The period may be preset. The decrease in the receive window of the TCP header may be set based on an actual network status.

The access device at the receive end receives an instruction that is transmitted by the access device at the transmit end and that is used to narrow a receive window of a TCP packet. The access device at the receive end dynamically adjusts the receive window of the TCP packet based on the received instruction that is used to narrow the receive window of the TCP packet and based on the periodically evaluated network congestion degree.

Based on a stipulation of the TCP protocol, a transmit rate at which the access device at the transmit end transmits the TCP packet is equal to a minimum value between the receive window of the TCP packet of the access device at the receive end and the congestion window of the TCP packet of the access device at the transmit end.

In the foregoing embodiment, because the receive window of the TCP packet is adjusted, the transmit rate at which the access device at the transmit end transmits the TCP packet can be reduced, to perform congestion control on the TCP packet.

In an embodiment of the present disclosure, for considering that network congestion changes with time, after decapsulating the transmit packet, to obtain the ECN congestion identifier through matching, the access device at the transmit end sets the inner congestion identifier and the preset timeout period in the IP header of the reply packet. The timeout period is set to dynamically adjust the receive window of the TCP packet.

The receive window of the TCP packet is dynamically adjusted in the preset timeout period. An initial value of the receive window of the TCP packet is restored beyond the preset timeout period. The initial value herein is set by the access device at the transmit end.

In an example, the preset timeout period is T. If the access device at the transmit end obtains the ECN congestion identifier through matching in the IP header of the reply packet, timing is started. In T, the receive window of the TCP packet can be dynamically adjusted. After T, the receive window of the TCP packet may be recovered to the initial value.

In the foregoing embodiment, when network congestion occurs, the transmit rate of the TCP packet is reduced in the preset timeout period. The TCP packet can be normally transmitted beyond the preset timeout period. In this way, an impact of the network congestion on TCP packet transmission can be reduced.

Figure 6:
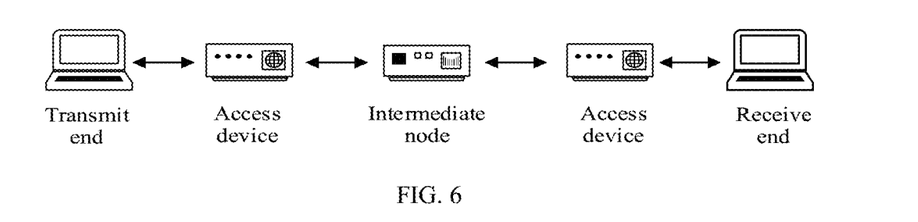
FIG. 6 is a schematic diagram of a network architecture for controlling network congestion according to an embodiment of the present disclosure.

The following describes the technical solutions in the embodiments of the present disclosure with reference to FIG. 6. FIG. 6 is a schematic diagram of a network architecture for controlling network congestion according to an embodiment of the present disclosure. The network architecture includes a transmit end, an access device at the transmit end, an intermediate node, an access device at a receive end, and the receive end.

The SDN packet processing refers to that a device processing a packet processes a packet based on an SDN flow table. There may be one or more SDN flow tables.

In this embodiment of the present disclosure, the SDN controller delivers preset flow tables to all the access switches, where the preset flow tables include the following.

Flow table A. When a packet enters an overlay network, an ECN identifier of an outer IP header of an overlay network packet header is set.

Flow table B. When the packet leaves the overlay network, if there is an ECN congestion identifier in the outer IP header of the overlay network packet header, a flow table C is generated.

Flow table C. Obtain a reply packet through matching, set an inner congestion identifier of an IP header of the reply packet, and preset a timeout period.

Flow table D. When the packet leaves the overlay network, an inner congestion identifier is obtained through matching, and then the packet is forwarded to a flow table E or a flow table F to perform congestion control.

Flow table E. If the reply packet is a TCP packet, a receive window of a TCP packet is narrowed.

Flow table F. If the reply packet is a UDP packet, a flow table G is generated.

Flow table G. A priority is higher than that of a normal forwarding flow table, and in a preset timeout period, a subsequent packet is forwarded to a preset slow channel for processing. The UDP packet is transmitted to a normal channel beyond a preset timeout period.

The following provides detailed descriptions based on the foregoing set flow table and with reference to devices in a network architecture for controlling network congestion.

S601. A transmit end transmits a transmit packet, and the transmit packet enters an access device at the transmit end. After the access device at the transmit end encapsulates an overlay packet header for the transmit packet, regardless of whether the transmit packet is a TCP packet or a UDP packet, the ECN identifier is set in an outer IP header of the overlay packet header based on a flow table A.

S602. Network congestion occurs in an intermediate node of an overlay network, and after the intermediate node detects the ECN identifier of the outer IP header of the overlay packet header, an ECN congestion identifier of the outer IP header of the overlay packet header is set.

S603. An access device at a receive end receives the transmit packet encapsulated with the overlay packet header. After the ECN congestion identifier of the outer IP header of the overlay packet header is obtained through matching based on a flow table B, a flow table C is generated.

Specifically, an inner congestion identifier is generated based on a source IP address of the transmit packet, a source port of the transmit packet, a destination IP address of the transmit packet, and a destination IP port of the transmit packet.

S604. After a reply packet at the receive end enters the access device at the receive end, the inner congestion identifier and a preset timeout period are set in an IP header of the reply packet based on the flow table C. Then, an overlay network packet header is encapsulated for the reply packet, and is forwarded to the overlay network.

S605. The reply packet at the receive end enters the access device at the transmit end, and decapsulates the overlay network packet header, and then the inner congestion identifier is obtained from a flow table D through matching. If the reply packet is a TCP packet, the TCP packet is transmitted to a flow table E for processing. If the reply packet is a UDP packet, the UDP packet is transmitted to a flow table E for processing.

S606. The TCP packet is obtained from the flow table E through matching, to narrow a receive window of a TCP header. Beyond the preset timeout period in the flow table C, a receive window of the TCP packet is restored to an initial value, and the TCP packet is normally forwarded.

S607. The UDP packet is obtained from a flow table F through matching, to generate a flow table G. A priority is higher than that of a normal forwarding flow table. In the preset timeout period, a subsequent packet is forwarded to a preset slow channel for processing. The UDP packet is transmitted to a normal channel beyond the preset timeout period.

In addition, the SDN controller may periodically collect statistical values of the flow table E and the flow table F, to estimate a recent congestion degree, and modifies a decrease in the receive window of the TCP header in the flow table E, and a delay of the slow channel in the flow table G.

Figure 7:
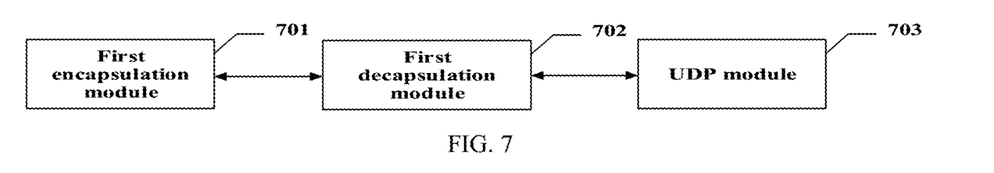
FIG. 7 is a schematic structural diagram of an access device according to an embodiment of the present disclosure.

FIG. 7 is a schematic structural diagram of an access device according to an embodiment of the present disclosure. An apparatus in FIG. 7 corresponds to the method in FIG. 3, and the apparatus further includes a first encapsulation module 701 configured to overlay an overlay network packet header on an encapsulation outer layer of a transmit packet, where the overlay network packet header includes an outer IP header, and an ECN identifier is set in the outer IP header, a first decapsulation module 702 configured to decapsulate the overlay network packet header for an encapsulated reply packet, where an inner congestion identifier that is based on the ECN identifier is obtained from an IP header of the decapsulated reply packet through matching, and a UDP module 703 configured to forward, if the decapsulated reply packet is the UDP packet, the UDP packet to a preset slow channel.

In an embodiment of the present disclosure, the access device further includes a TCP module 704 (not shown) configured to transmit, if the decapsulated reply packet is a TCP packet, an instruction of decreasing a receive window of the TCP packet.

In this embodiment of the present disclosure, the ECN identifier is set in an ECN field of the outer IP header.

In this embodiment of the present disclosure, the UDP packet 703 is further configured to forward the UDP packet to the preset slow channel using a preset slow forwarding port.

In an embodiment of the present disclosure, the UDP module 703 is further configured to dynamically adjust a delay value of the preset slow channel based on the periodically estimated network congestion degree, and forward the UDP packet to the preset slow channel after dynamic adjustment.

In this embodiment of the present disclosure, the UDP packet 703 is further configured to preferentially forward the UDP packet to the preset slow channel in a preset timeout period.

In this embodiment of the present disclosure, the UDP packet 703 is further configured to transmit the UDP packet to a normal channel beyond the preset timeout period.

Figure 8:
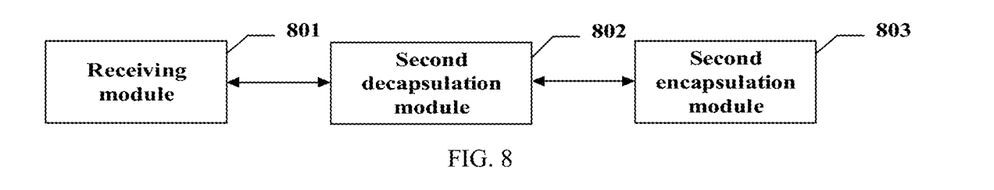
FIG. 8 is a schematic structural diagram of an access device according to another embodiment of the present disclosure.

FIG. 8 is a schematic structural diagram of an access device according to another embodiment of the present disclosure. An apparatus in FIG. 8 corresponds to the method in FIG. 5, and the apparatus further includes a receiving module 801 configured to receive a transmit packet encapsulated with an overlay network packet header, where the overlay network packet header includes an outer IP header, an ECN congestion identifier is set in the outer IP header, and the ECN congestion identifier is set based on an ECN identifier of the outer IP header when an intermediate node is congested, a second decapsulation module 802 configured to, if the ECN congestion identifier is obtained through matching, set an inner congestion identifier in an IP header of a reply packet, and a second encapsulation module 803 configured to encapsulate the overlay network packet header for the reply packet provided with the inner congestion identifier, and transmit the encapsulated reply packet.

In an embodiment of the present disclosure, the second decapsulation module 803 is further configured to decapsulate the transmit packet, to obtain the ECN congestion identifier through matching in the IP header of the overlay network packet header.

A source IP address, a source port, a destination IP address, and a destination IP port of the transmit packet are obtained.

An inner congestion identifier is generated based on the source IP address, the source port, the destination IP address, and the destination IP port of the transmit packet.

The inner congestion identifier is set in the IP header of the reply packet.

In an embodiment of the present disclosure, the access device further includes a TCP module 804 (not shown) configured to dynamically adjust a receive window of a TCP packet based on a received instruction for narrowing a receive window of a TCP packet and based on a periodically evaluated network congestion degree.

In an embodiment of the present disclosure, the second decapsulation module 803 is further configured to decapsulate the transmit packet to obtain the ECN congestion identifier through matching such that the inner congestion identifier and a preset timeout period are set in the IP header of the reply packet.

The TCP module 804 is further configured to dynamically adjust the receive window of the TCP packet in the preset timeout period.

In this embodiment of the present disclosure, the TCP module 804 is further configured to restore the receive window of the TCP packet to an initial value beyond the preset timeout period.

Figure 9:
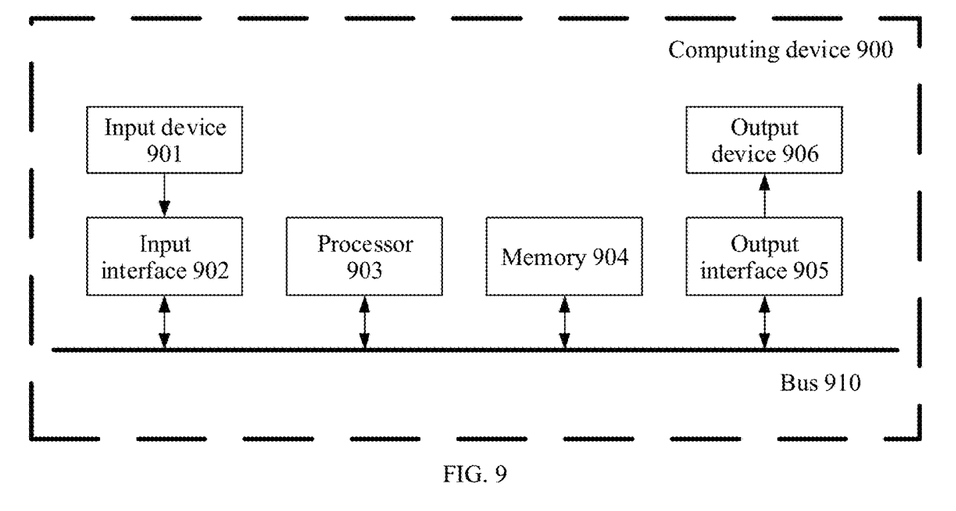
FIG. 9 is a structural diagram illustrating an exemplary hardware architecture of a computing device capable of implementing control of network congestion and control of an access device according to an embodiment of the present disclosure.

FIG. 9 is a structural diagram illustrating an exemplary hardware architecture of a computing device capable of implementing control of network congestion and control of an access device according to an embodiment of the present disclosure. The computing device 900 in FIG. 9 includes an input device 901, an input interface 902, a processor 903, a memory 904, an output interface 905, and an output device 906.

The input interface 902, the processor 903, the memory 904, and the output interface 905 are connected to each other using a bus 910. The input device 901 and the output device 906 are connected to the bus 910 using the input interface 902 and the output interface 905, respectively, to connect to another component of the computing device 900.

Specifically, the input device 901 receives external input information, and transmits the input information to the processor 903 using the input interface 902. The processor 903 processes the input information according to a computer executable instruction stored in the memory 904, to generate output information, temporarily or permanently stores the output information in the memory 904, and then transmits the output information to the output device 906 through the output interface 905. The output device 906 outputs the output information to an outside of the computing device 900 for use by a user.

The computing device 900 may perform the steps in the foregoing communication method in this application.

The processor 903 may be one or more central processing units (CPUs). When a processor 601 or a processor 701 is a CPU, the CPU may be a single-core CPU, or may be a multi-core CPU.

The memory 904 may be, but is not limited to, one or more of a random access memory (RAM), a read-only memory (ROM), an erasable programmable read-only memory (EPROM), a compact disc read-only memory (CD-ROM), a hard disk, and the like. The memory 904 is configured to store program code.

Figure 10:
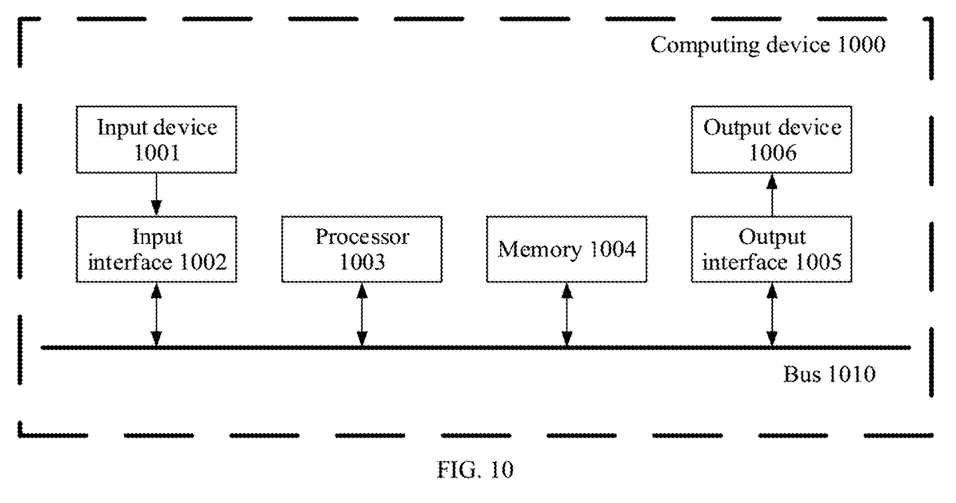
FIG. 10 is a structural diagram illustrating an exemplary hardware architecture of a computing device capable of implementing control of network congestion and control of an access device according to another embodiment of the present disclosure.

FIG. 10 is a structural diagram illustrating an exemplary hardware architecture of a computing device capable of implementing control of network congestion and control of an access device according to an embodiment of the present disclosure. The computing device 1000 in FIG. 10 includes an input device 1001, an input interface 1002, a processor 1003, a memory 1004, an output interface 1005, and an output device 1006.

The input interface 1002, the processor 1003, the memory 1004, and the output interface 1005 are connected to each other using a bus 1010. The input device 1001 and the output device 1006 are connected to the bus 1010 using the input interface 1002 and the output interface 1005, respectively, to connect to another component of the computing device 1000.

Specifically, the input device 1001 receives external input information, and transmits the input information to the processor 1003 using the input interface 1002. The processor 1003 processes the input information according to a computer executable instruction stored in the memory 1004, to generate output information, temporarily or permanently stores the output information in the memory 1004, and then transmits the output information to the output device 1006 through the output interface 1005. The output device 1006 outputs the output information to an outside of the computing device 1000 for use by a user.

The computing device 1000 may perform the steps in the foregoing communication method in this application.

The processor 1003 may be one or more CPUs. When a processor 601 or a processor 701 is a CPU, the CPU may be a single-core CPU, or may be a multi-core CPU.

The memory 1004 may be but is not limited to one or more types of a RAM, a ROM, an EPROM, a CD-ROM, a hard disk, or the like. The memory 1004 is configured to store program code.

All or some of the foregoing embodiments may be implemented by software, hardware, firmware, or any combination thereof. When all or some of the foregoing embodiments are implemented in a form of a computer program product, the computer program product includes one or more computer instructions. When the computer program instructions are loaded or executed on a computer, the procedures or functions according to the embodiments of the present disclosure are all or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state drive (SSD)), or the like.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to descriptions in the method embodiment.

What is claimed is:

1. A method for controlling network congestion, comprising:
    overlaying an outer overlay network packet header on an encapsulation outer layer of a transmit packet, wherein the outer overlay network packet header comprises an outer Internet Protocol (IP) header, and wherein the outer IP header comprises an explicit congestion notification (ECN) identifier in the outer IP header;
    decapsulating the outer overlay network packet header from an encapsulated reply packet to obtain a decapsulated reply packet;
    obtaining, through matching, an inner congestion identifier from an IP header of the decapsulated reply packet, wherein the inner congestion identifier is based on the ECN identifier; and
    forwarding the decapsulated reply packet on a preset slow channel when the decapsulated reply packet is a User Datagram Protocol (UDP) packet.

2. The method of claim 1, wherein after obtaining the inner congestion identifier, the method further comprises sending an instruction for narrowing a receive window of the decapsulated reply packet when the decapsulated reply packet is a Transmission Control Protocol (TCP) packet.

3. The method of claim 1, wherein the IP header comprises an ECN field, and wherein the ECN field comprises the ECN identifier.

4. The method of claim 1, further comprising forwarding the UDP packet on the preset slow channel using a preset slow forwarding port when the decapsulated reply packet is the UDP packet.

5. The method of claim 1, further comprising:
    dynamically adjusting a delay value of the preset slow channel based on a periodically estimated network congestion degree; and
    forwarding the UDP packet on the preset slow channel after dynamically adjusting the delay value when the decapsulated reply packet is the UDP packet.

6. The method of claim 1, further comprising forwarding the UDP packet on the preset slow channel in a preset timeout period when the decapsulated reply packet is the UDP packet.

7. The method of claim 6, wherein after forwarding the UDP packet on the preset slow channel in the preset timeout period, the method further comprises sending the UDP packet on a normal channel beyond the preset timeout period.

8. A method for controlling network congestion, comprising:
    receiving a transmit packet that encapsulates an overlay network packet header, wherein the overlay network packet header comprises an outer Internet Protocol (IP) header, wherein the outer IP header comprises an explicit congestion notification (ECN) congestion identifier, and wherein the ECN congestion identifier is based on an ECN identifier of the outer IP header when congestion occurs in an intermediate node;
    decapsulating the transmit packet to obtain the ECN congestion identifier through matching;
    setting an inner congestion identifier and a preset timeout period in an IP header of a reply packet;
    receiving an instruction to narrow a receive window of a Transmission Control Protocol (TCP) packet;
    dynamically adjusting, according to the instruction, the receive window of the TCP packet in the preset timeout period based on a periodically evaluated network congestion degree;
    encapsulating the overlay network packet header with the inner congestion identifier in the reply packet to obtain an encapsulated reply packet; and
    sending the encapsulated reply packet.

9. The method of claim 8, further comprising:
    decapsulating the transmit packet to obtain the ECN congestion identifier through matching from the IP header of the overlay network packet header;
    obtaining, from the transmit packet, a source IP address, a source port, a destination IP address, and a destination IP port;
    generating the inner congestion identifier based on the source IP address, the source port, the destination IP address, and the destination IP port; and
    setting the inner congestion identifier in the IP header of the reply packet.

10. The method of claim 8, wherein after dynamically adjusting the receive window of the TCP packet in the preset timeout period, the method further comprises restoring the receive window of the TCP packet to an initial value beyond the preset timeout period.

11. A computing device, comprising:
    a processor; and
    a memory coupled to the processor and storing instructions that, when executed by the processor, cause the computing device to be configured to:
        overlay an outer overlay network packet header on an encapsulation outer layer of a transmit packet, wherein the outer overlay network packet header comprises an outer Internet Protocol (IP) header, and wherein the outer IP header comprises an explicit congestion notification (ECN) identifier in the outer IP header;
        decapsulate the outer overlay network packet header from an encapsulated reply packet to obtain a decapsulated reply packet;
        obtain an inner congestion identifier from an IP header of the decapsulated reply packet through matching that is based on the ECN identifier; and
        forward the decapsulated reply packet on a preset slow channel when the decapsulated reply packet is a User Datagram Protocol (UDP) packet.

12. A computing device, comprising:
a processor; and a memory coupled to the processor and storing instructions that, when executed by the processor, cause the computing device to be configured to:

receive a transmit packet that encapsulates an overlay network packet header, wherein the overlay network packet header comprises an outer Internet Protocol (IP) header, wherein an explicit congestion notification (ECN) congestion identifier is set in the outer IP header, and wherein the ECN congestion identifier is based on an ECN identifier of the outer IP header when congestion occurs in an intermediate node;

decapsulate the transmit packet to obtain the ECN congestion identifier through matching;

set an inner congestion identifier and a preset timeout period in an IP header of a reply packet based on the ECN identifier;

receive an instruction to narrow a receive window of a Transmission Control Protocol (TCP) packet;

dynamically adjust, according to the instruction, the receive window of the TCP packet in the preset timeout period based on a periodically evaluated network congestion degree;

encapsulate the overlay network packet header with the inner congestion identifier in the reply packet to obtain an encapsulated reply packet; and send the encapsulated reply packet.

13. The computing device of claim 11, wherein after obtaining the inner congestion identifier, the instructions further cause the processor to be configured to send an instruction for narrowing a receive window of the decapsulated reply packet when the decapsulated reply packet is a Transmission Control Protocol (TCP) packet.

14. The computing device of claim 11, wherein the ECN identifier comprises an ECN field, and wherein the ECN field comprises the ECN identifier.

15. The computing device of claim 11, wherein the instructions further cause the processor to be configured to forward the UDP packet on the preset slow channel using a preset slow forwarding port when the decapsulated reply packet is the UDP packet.

16. The computing device of claim 11, wherein the instructions further cause the processor to be configured to:

dynamically adjust a delay value of the preset slow channel based on a periodically estimated network congestion degree; and forward the UDP packet on the preset slow channel after dynamically adjusting the delay value when the decapsulated reply packet is the UDP packet.

17. The computing device of claim 11, wherein the instructions further cause the processor to be configured to forward the UDP packet on the preset slow channel in a preset timeout period when the decapsulated reply packet is the UDP packet.

18. The computing device of claim 17, wherein after forwarding the UDP packet on the preset slow channel in the preset timeout period, the instructions further cause the processor to be configured to send the UDP packet on a normal channel beyond the preset timeout period.

19. The computing device of claim 12, wherein the instructions further cause the computing device to be configured to:

decapsulate the transmit packet to obtain the ECN congestion identifier through matching from the IP header of the overlay network packet header;

obtain, from the transmit packet, a source IP address, a source port, a destination IP address, and a destination IP port;

generate the inner congestion identifier based on the source IP address, the source port, the destination IP address, and the destination IP port; and set the inner congestion identifier in the IP header of the reply packet.

20. The computing device of claim 12, wherein the instructions further cause the computing device to be configured to restore the receive window of the TCP packet to an initial value beyond the preset timeout period after dynamically adjusting the receive window of the TCP packet.

* * * * *